Patented June 19, 1923.

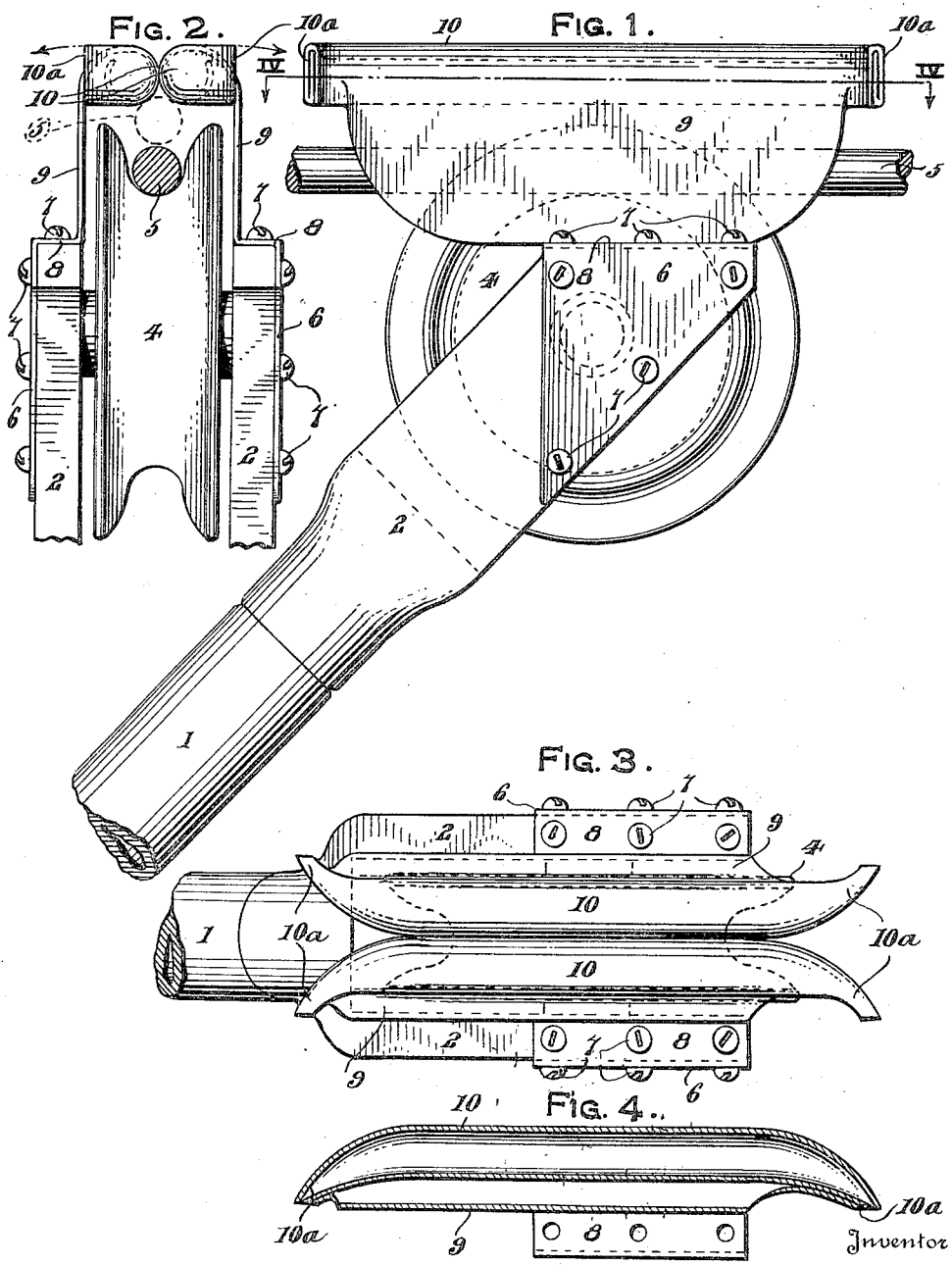

1,459,663

UNITED STATES PATENT OFFICE.

JOHN TRUNKO, OF ARDEN, WEST VIRGINIA.

TROLLEY-WHEEL GUARD.

Application filed March 12, 1923. Serial No. 624,411.

*To all whom it may concern:*

Be it known that I, JOHN TRUNKO, a citizen of Hungary, residing at Arden, in the county of Barbour and State of West Virginia, have invented certain new and useful Improvements in Trolley-Wheel Guards, of which the following is a specification.

This invention relates to certain new and useful improvements in trolley wheel guards and has for its primary object to provide a guard carried by the head of a trolley pole and associated with a trolley wheel in a manner to prevent accidental escape or jumping of the trolley wheel from the conductor wire.

Another object of the invention to provide a trolley wheel guard wherein a resilient guard arm is carried by the trolley pole head at each side of the wheel adapted for contact with each other when a trolley wheel is properly tracking upon the conductor wire, the ends of the resilient guard arms being so constructed as to permit the passing of trolley frogs and cross wires, and further operating as a finder for the trolley wheel.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a side elevational view of a trolley pole head showing the wheel guard mounted thereon with the wheel in tracking engagement with a conductor wire, Figure 2 is a fragmentary front elevational view of the trolley pole head and wheel, Figure 3 is a top plan view, and Figure 4 is a longitudinal horizontal sectional view taken on line IV—IV of Fig. 1 showing the formation of one of the guard arms.

Referring more in detail to the accompanying drawing, and particularly to Figs. 1 and 2 there is illustrated a trolley wheel guard wherein the pole 1 supports a head 2 that is bifurcated to provide side arms 3 between which the trolley wheel 4 is journaled.

As shown more clearly in Fig. 1, the outer ends of the side members 3 of the trolley head are cut at an angle that is disposed in parallelism with the trolley wire or conductor 5 when the wheel 4 is in tracking engagement therewith. A guard arm is associated with each side member 3 of the trolley head and includes a side plate 6 bolted as at 7 to the outer face of the side member 3, the plate 6 overlying the end bearing for the trolley wheel 4 as shown by dotted lines in Fig. 1 properly retaining the trolley wheel in the head and eliminating the necessity of providing anchoring means for the trolley wheel bearing. The upper edge of the side plate 6 is angularly bent as at 8 for contacting the angularly cut outer end of the side member 3 and is secured thereto by fastening devices 7, and said plate further includes an upwardly directed resilient side wall 9 having its upper edge rolled upon itself to form a horizontally disposed guard 10 of substantial tubular formation as shown in Figs. 2 to 4 with the opposite ends thereof moved into proximity and flared outwardly as at 10$^a$ to permit the guard 10 readily to pass over trolley frogs or other cross wires. The oppositely positioned guards 10 carried by the resilient arms 9 contact each other when the wheel 4 engages the trolley wire 5, the resiliency of the side arms 9 tending to maintain the wheel in proper engagement with the wire and preventing accidental disengagement thereof. The outwardly flared ends 10$^a$ of the guard arms will also assist in positioning the wheel in engagement with the wire.

While there is herein shown and described the preferred embodiment of the present invention it is nevertheless to be understood that minor changes may be made therein without departing from the spirit and scope of the invention as claimed.

What is claimed as new is:—

1. In a trolley wheel guard, a pole having a trolley wheel journaled in the head thereof, a guard plate secured to each side of the trolley pole head and overlying the end bearing for the trolley wheel, upwardly directed resilient arms carried by the guard plate, the upper ends of the resilient plates being rolled upon themselves to provide wheel guards adapted for resilient engagement upwardly of the trolley wheel.

2. In a trolley wheel guard, a pole having a trolley wheel journaled in the head thereof, a guard plate secured to each side of the trolley pole head and overlying the end bearing for the trolley wheel, upwardly directed resilient arms carried by the guard plate, the upper ends of the resilient plates being rolled upon themselves to provide wheel guards adapted for resilient engagement upwardly of the trolley wheel, the rolled portions of the wheel guards adjacent each end thereof being moved into proximity and respectively flared outwardly.

In testimony whereof I affix my signature.

JOHN TRUNKO.